(12) United States Patent
Geier et al.

(10) Patent No.: US 10,840,029 B2
(45) Date of Patent: Nov. 17, 2020

(54) CAPACITOR HAVING COATED PORES

(71) Applicant: Deutsches Zentrum für Luft- und Raumfahrt e.V., Cologne (DE)

(72) Inventors: Sebastian Geier, Braunschweig (DE); Thorsten Mahrholz, Salzgitter (DE)

(73) Assignee: DEUTSCHES ZENTRUM FÜR LUFT- UND RAUMFAHRT E.V., Cologne (DE)

( * ) Notice: Subject to any disclaimer, the term of this patent is extended or adjusted under 35 U.S.C. 154(b) by 109 days.

(21) Appl. No.: 16/014,350

(22) Filed: Jun. 21, 2018

(65) Prior Publication Data
US 2018/0301285 A1 Oct. 18, 2018

Related U.S. Application Data

(63) Continuation of application No. PCT/EP2016/077968, filed on Nov. 17, 2016.

(30) Foreign Application Priority Data

Dec. 23, 2015 (DE) .................. 10 2015 122 773

(51) Int. Cl.
*H01G 9/048* (2006.01)
*H01G 9/042* (2006.01)
(Continued)

(52) U.S. Cl.
CPC ........... *H01G 9/048* (2013.01); *H01G 9/0425* (2013.01); *H01G 11/04* (2013.01); *H01G 11/26* (2013.01);
(Continued)

(58) Field of Classification Search
CPC ...... H01G 9/048; H01G 9/0425; H01G 11/04; H01G 11/26; H01G 11/48; H01G 11/56;
(Continued)

(56) References Cited

U.S. PATENT DOCUMENTS

| 7,279,015 B2 | 10/2007 | Clevios |
| 9,178,243 B2 | 11/2015 | Yamaguchi et al. |

(Continued)

FOREIGN PATENT DOCUMENTS

| DE | 10 2004 022 110 A1 | 12/2005 |
| DE | 11 2007 000 434 T5 | 2/2009 |

(Continued)

OTHER PUBLICATIONS

International Search Report in co-pending, relating PCT Application No. PCT/EP2016/077968, dated Jun. 26, 2018.

*Primary Examiner* — Michael P McFadden
(74) *Attorney, Agent, or Firm* — Thomas | Horstemeyer, LLP

(57) ABSTRACT

The invention relates to a capacitor with a layered construction on a base element having open pores with inner pore surfaces. The base element is electrically conductive at least in a part of the inner pore surfaces and therefore forms a continuous electrode. The electrically conductive part of the inner pore surfaces is nanostructured. In the capacitor a layer of a solid body electrolyte is directly arranged on the electrode and an electrically conductive counter-electrode layer forming a counter electrode is directly arranged on the solid body electrolyte. The counter electrode is applied as a thin layer so that within the open pores a continuous free space remains. The invention also relates to a construction element comprising a foam structure which is part of such a capacitor. The invention also relates to a method of manufacturing such a construction element.

7 Claims, 3 Drawing Sheets

(51) Int. Cl.
*H01G 11/04* (2013.01)
*H01G 11/26* (2013.01)
*H01G 11/70* (2013.01)
*H01G 11/48* (2013.01)
*H01G 11/56* (2013.01)

(52) U.S. Cl.
CPC .............. *H01G 11/48* (2013.01); *H01G 11/56* (2013.01); *H01G 11/70* (2013.01); *Y02E 60/13* (2013.01)

(58) Field of Classification Search
CPC ........ H01G 11/70; H01G 4/085; H01G 4/008; H01G 4/012; H01G 4/33; Y02E 60/13; H01L 28/82

See application file for complete search history.

(56) References Cited

U.S. PATENT DOCUMENTS

| | | | |
|---|---|---|---|
| 2007/0134549 A1 | 6/2007 | Nathan et al. | |
| 2009/0291368 A1 | 11/2009 | Newman et al. | |
| 2011/0164349 A1 | 7/2011 | Snyder et al. | |
| 2012/0154982 A1* | 6/2012 | Ota | H01G 9/04 361/502 |
| 2013/0266856 A1* | 10/2013 | Ryhanen | H01M 10/04 429/211 |
| 2014/0050988 A1* | 2/2014 | Wei | H01M 2/20 429/235 |

FOREIGN PATENT DOCUMENTS

| | | |
|---|---|---|
| DE | 10 2009 030 558 A1 | 12/2010 |
| GB | 1 044 444 | 9/1966 |
| JP | 2011-192688 A | 9/2011 |
| WO | 2003/012908 A2 | 2/2003 |
| WO | 2007/097434 A1 | 8/2007 |
| WO | 2010/149515 A9 | 12/2010 |

\* cited by examiner

CAPACITOR HAVING COATED PORES

CROSS REFERENCE TO RELATED APPLICATIONS

This application is a continuation in part to International Application PCT/EP2016/077968 with an international filing date of Nov. 17, 2016 and claiming priority to co-pending German Patent Application No. DE 10,2015/122,773.8 entitled "Kondensator mit beschichteten Poren", filed on Dec. 23, 2015.

FIELD

The invention relates to a capacitor with a layered construction on a base element with open pores comprising inner pore surfaces, especially a supercapacitor with such a layered construction. The invention also relates to a construction element with a foam structure which is part of such a capacitor and a method of manufacturing such a construction element.

BACKGROUND

German patent application publication DE 10,2009/030,558 A1 (corresponding to WO 2010/149,515 A9) discloses a highly porous, sponge-like supporting body of metal or an alloy containing metal, which is coated with an active material on its pores formed by the porous structure by being dipped into the active material. The supporting body coated with the active material forms an electrode of a battery. The active material is active in so far as that it is chemically reactive in the loading and unloading of the battery. Several such electrodes are dipped into an electrolyte and separated from each other in the electrolyte by separators in order to form the battery.

German patent application DE 10,2004/022,110 A1 (corresponding to U.S. Pat. No. 7,279,015 B2) discloses a capacitor with a porous base body that is coated with a dielectric. The dielectric in turn is coated with a solid body electrolyte which in turn is coated with a counter electrode layer. The dielectric and the electrolyte enter into the pores of the base body, while conductive layers forming the counter electrode layer do not or only to a certain extent enter into the pores.

British patent application publication GB 1044444 discloses a capacitor in which a porous electrically conductive base body is coated with a dielectric, which enters into the pores of the base body, and in which the dielectric in turn is coated with an electrically conductive solid body material.

Japanese patent application publication JP 2011-192688 A discloses a porous electrode coated with a dielectric, which in turn is coated with a conductive polymer layer. The dielectric and the conductive polymer layer each enter into the pores of the electrode.

International patent application publication WO 03/012908 A2 discloses a capacitor having a porous or sponge-like, that is, open-pored base element. The open-pored base element is coated with a thin layer of an electrolyte. Subsequently, a counter electrode in fluid shape is inserted into the pores of the base element. The counter electrode fills the pores of the base element completely so that electrode and counter electrode intersect with each other in a finger-like way. A mean value of the thickness of the electrolyte layer is smaller than $10^3$ nm. A minimum distance between electrode and counter electrode is 500 nm to 5000 nm German publication DE 11,2007/000,434 T5 of an international patent application originally published as WO 2007/97434 A1 (corresponding to U.S. Pat. No. 9,178,243 B2) discloses an electro-chemical cell for which a solid oxide fuel cell is given as an example. The electrochemical cell comprises a foam base element having several through holes. The through holes are not identical to the foam pores of the foam base element. Each of the through holes on its inner side is possibly coated with a first electrode layer (if the porous support body itself is non-conductive); and in any case it is coated with an electrolyte layer and a counter electrode layer. Therefore, either the base element may be electrically conductive or an electrically conductive electrode layer may have been applied between the base element and the electrolyte. The through holes have diameters of $4 \cdot 10^5$ nm to $8 \cdot 10^5$ nm, the electrolyte layer has a thickness of $1 \cdot 10^4$ nm to $1.5 \cdot 10^4$ nm.

US patent application US 2013/0266856 A1 discloses a supercapacitor in which an electrode is formed by an open interconnected wall structure having pores. Inside the pores, an electrolyte and material for a second electrode is applied to the electrode. The electrode may be formed by a sponge coated to be electrically conductive. It may also be formed by arranging a plurality of spherical particles to form a lattice, coating the lattice with the electrode material and removing the spherical particles. The electrode, once formed in this way, is not treated in any way.

US patent application US 2009/0291368 A1 discloses a battery with an anode comprising a basis of carbon foam or another electrically conductive foam material having pores. A separator layer and a cathode layer are deposited onto the anode. The cathode may be formed from a slurry containing nanoparticles together with a binder and carbon black. Thus, the nanoparticles are embedded in the cathode layer.

US patent application US 2011/0164349 A1 discloses a capacitor that can be used as a structural component. Several internal structures for the capacitor are disclosed, including a honeycomb structure. The capacitor may be coated with, encapsulated in, or otherwise protected by an appropriate material.

SUMMARY OF THE INVENTION

The present invention relates to a capacitor with a layered construction on a base element. The base element has open pores comprising inner pore surfaces and is electrically conductive at least in a part of the inner pore surfaces. The base element thus forms a continuous electrode. The electrically conductive part of the inner pore surfaces is nano-structured. A layer of a solid body electrolyte is arranged directly on the electrode. An electrically conductive counter-electrode layer forming a counter electrode is arranged directly on the solid body electrolyte. The counter electrode forms a thin layer so that within the open pores a continuous free space remains.

Here and in the following, the words "electrode" and "counter electrode" do not indicate a certain polarity.

Further, the present invention relates to a construction element comprising a foam structure. The foam structure is part of a capacitor with a layered construction on a base element, where the base element has pores comprising inner pore surfaces and is electrically conductive at least in a part of the inner pore surfaces, thus forming a continuous electrode. The base element comprises the foam structure, providing the pores. The electrically conductive part of the inner pore surfaces is nanostructured. A layer of a solid body electrolyte is arranged directly on the electrode. An electrically conductive counter-electrode layer forming a counter electrode is arranged directly on the solid body electrolyte. The counter electrode forms a thin layer, so that within the open pores a continuous free space remains.

Further, the present invention relates to a method of manufacturing a construction element comprising a base element having open pores with inner pore surfaces and being electrically conductive at least in a part of the inner pore surfaces. The base element is part of a capacitor with a layered construction. An empty space in a hollow body is foam-filled with a foam material to form a foam structure. In a first alternative, if the foam structure is electrically conductive, a layer of a solid body electrolyte is applied directly to an electrode provided by the foam structure. In this case, the foam structure forms the base element. In a second alternative, if the foam structure is electrically non-conductive, an electrically conductive electrode layer is applied to at least a part of the foam structure. In this way, the base element is formed. The layer of the solid body electrolyte is then applied directly to an electrode provided by the base element with the electrically conductive electrode layer. After the application of the solid body electrolyte, a thin electrically conductive counter-electrode layer for forming a counter electrode is applied directly to the solid body electrolyte such that a continuous free space remains within the open pores.

With the novel capacitor, the novel construction element and the novel method of manufacturing a construction element it is possible to provide a capacitor having an especially high energy density while being especially suitable for lightweight construction at the same time or a construction element containing such a capacitor.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon illustrating the principles of the present invention. In the drawings, like reference numerals designate corresponding parts throughout the several views.

DETAILED DESCRIPTION

Figure 1:
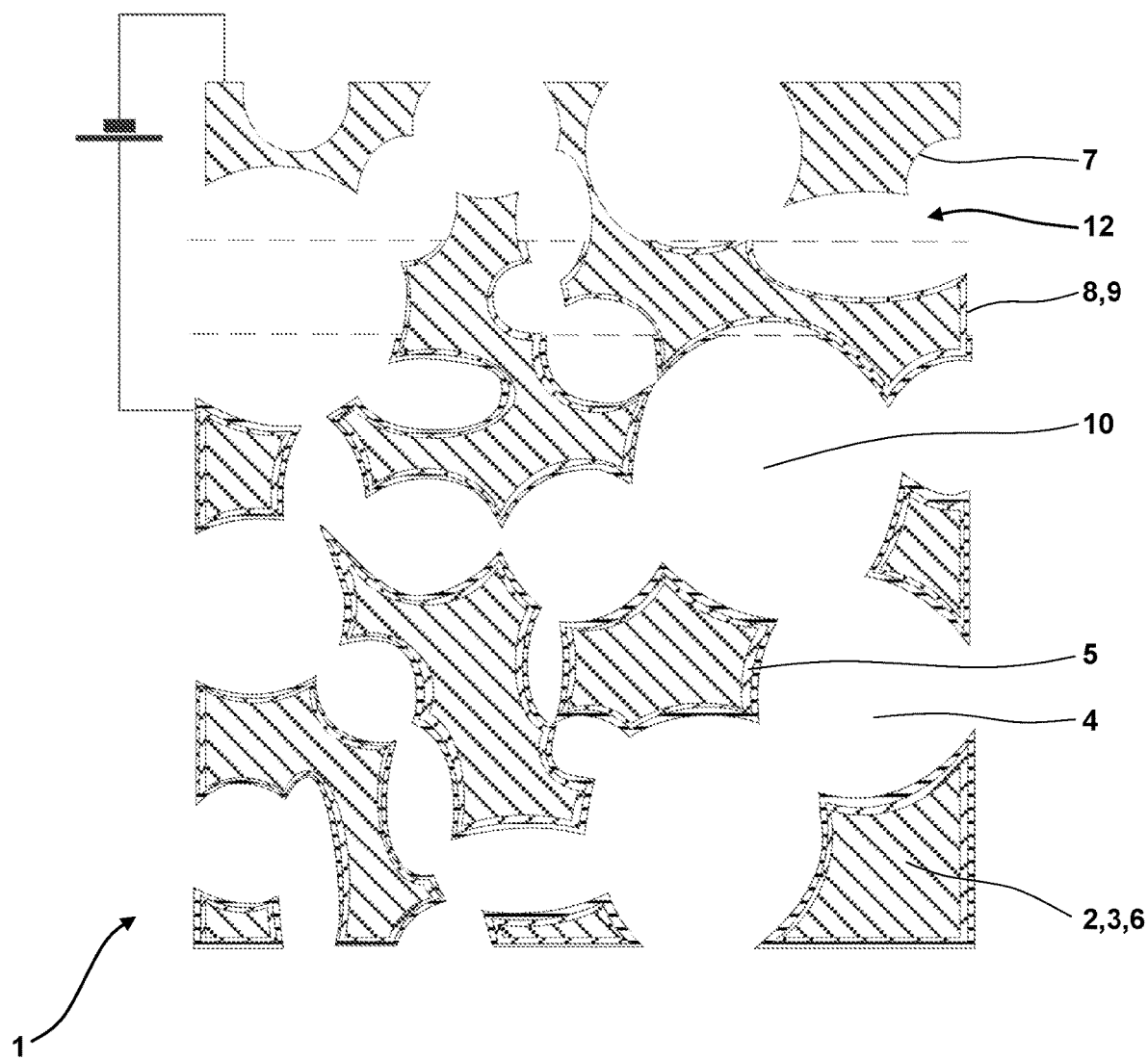
FIG. 1 is a schematic depiction of a capacitor according to the invention with an electrically conductive foam structure.

The invention relates to a capacitor with a layered construction or structure on a base element with open pores comprising inner pore surfaces. The base element preferably is foam-like, so that it comprises a high number of open pores. At least in a part of the inner pore surfaces the base element is electrically conductive. In this way, the base element forms a continuous electrode. A layer of a solid body electrolyte is arranged on the electrode. Suitable solid body electrolytes are, for example, Nafion or Hylon. Also suitable are polymer matrices with embedded organic charged molecules of an ionic fluid or modified resins and lithium phosphorus oxynitride (LiPON) or other lithium compounds such as $Li_2S$—$P_2S_5$, $Li_{14}Zn(GeO_4)_4$ oder $Li_{1.3}Al_{0.3}Ti_{1.7}(PO_4)_3$ (NASICON). The solid body electrolyte is arranged directly on the electrode.

Directly on the solid body electrolyte, in turn, an electrically conductive counter-electrode layer is arranged, forming a counter electrode. The counter electrode may be formed of a metal or an electrically conductive polymer. The separator, usual in capacitors otherwise, is dispensed with. The counter electrode is applied as a thin layer—or, in other words, forms a thin coating—, so that within the open pores a continuous free space remains. The continuous free space extends over more than one pore. Preferably, however, the continuous free space extends over all pores or substantially all pores of the base element. The foam-like structure of the base element, therefore, may remain. This, especially, assists in making the capacitor according to the invention suitable for lightweight construction and in preserving the characteristics of the foam structure such as a thermic insulation effect.

In the capacitor according to the invention, the surfaces of the electrode and the counter electrode are defined by the foam structure. Since in a foam the surface is especially large compared to the mass of the foam, an especially light capacitor with a very large electrode surface area and a very large counter electrode surface area can be produced based on a foam. The capacity of a capacitor is directly dependent on the electrode surface and the counter electrode surface. This can be made clear as follows: For a parallel-plate capacitor, the capacity follows the formula $C=\epsilon_0\epsilon_r A/d$ (with the vacuum permittivity $\epsilon_0$, the relative permittivity $\epsilon_r$ of the electrolyte, the distance d of electrode and counter electrode and the surface area A of the electrode/counter electrode). With a given electrolyte, $\epsilon_0$ and $\epsilon_r$ are constant. Therefore, the capacity can only be increased by choosing the distance to be as small as possible and the surface area to be as large as possible. A capacitor based on a foam structure therefore has an especially high capacity because of its very large electrode surface area alone.

The electrically conductive part of the inner pore surfaces is nanostructured. In order to achieve this, electrically conductive hierarchical substructures may be applied to the inner pore surface. Carbon nanotubes, graphenes or metallic particles are, e.g., suitable for forming electrically conductive hierarchical substructures. "Nanostructured" here means dimensions of the hierarchical substructures in the range of several to several hundred nanometers. The nanostructuring may be inherent in the inner pore surfaces or may have been applied additionally, for example by chemical vapor deposition (CVD) or physical vapor deposition (PVD).

For example, graphene flakes may be applied to the surface to be nanostructured. Graphene flakes can be manufactured in a microwave plasma-enhanced CVD (PECVD) method using a microwave plasma source and $CH_4:H_2$ with a 1:8 ration. The growing of the graphene flakes takes three steps: First, a graphite layer is formed. In the graphite layer irregular cracks or tears begin to form and their edges eventually begin to curve upwards. Second, graphene nucleates on the edges curving upwards. Third, free-standing graphene flakes grow. As another example, metallic nanoparticles can be manufactured and/or applied to the surface to be nanostructured e.g. by CVD or PVD or another plasma process. The metallic nanoparticles may e.g. comprise silver, copper, gold, platinum or other electrically conductive metals.

By nanostructuring, the surface area of the inner pore surfaces is increased again with respect to a pure foam structure. Since, as shown above, the capacity of the capacitor is directly dependent on the electrode surface area and the counter electrode surface area, this is especially advantageous for obtaining a high capacity.

Additionally, by applying the solid body electrolyte and the counter electrode directly onto the electrode as thin layers or coatings, the distance between the electrode and the counter electrode is made to be very small. This does not only have a positive effect on the capacity, but it also causes the diffusion paths for ions migrating between the electrode and the counter electrode to be short. Short reaction times result. Therefore, from the construction according to the invention, a capacitor results that has short reaction times, a high capacity and relative to that a small overall mass—that is, a high potential for lightweight construction—compared to the capacitors as known from prior art. This effect is assisted by the separator—that in capacitors is usual—being omitted and therefore a thickness and a mass of an additional separator layer being dispensed with. The capacitor according to the invention therefore is especially suitable for being used where there are high demands made on lightweight construction, for example on aircraft and spacecraft, but also on other vehicles. Additionally, the capacitor according to the invention is especially small and compact. Therefore it is suitable for employment in objects which e.g. are frequently carried by persons, such as mobile phones and laptop computers, or other objects which are intended to be especially lightweight and/or compact.

The electrode may be realized on the base element in two fundamentally different ways: Firstly, the base element may comprise an electrically non-conductive foam structure and an electrically conductive electrode layer where the electrically conductive part of the inner pore surfaces is. The electrically conductive electrode layer may fully or partially coat the inner pore surfaces. Preferably, the electrically conductive electrode layer coats the larger part of the inner pore surfaces—preferably as much of the inner pore surfaces as possible—and in this way forms an electrically conductive electrode layer that is continuous covering as large an area as possible. Only continuous parts of the electrically conductive electrode layer form the electrode.

The electrically conductive electrode layer may be formed from a suitable electrically conductive material, especially a metal or an electrically conductive polymer. The electrically conductive electrode layer may be formed from the same material as the counter electrode. It is, however, possible for the electrically conductive electrode layer to be formed from a different material than the counter electrode.

The non-conductive foam structure may for example be formed from an inorganic foam (e.g. an aerogel) or an organic foam such as a thermoplastic foam (e.g. expanded polystyrene, expanded polypropylene or expanded polyvinyl chloride), an elastomeric foam (e.g. flexible polyurethane foam or nitrile rubber [acrylonitrile butadiene; NBR]) or a thermoset foam (e.g. rigid polyurethane foam or phenoplastic foam/phenoplastic resin foam). However, any material is suitable that can form a firm or stable foam structure.

The thickness of the electrically conductive electrode layer in the region of the electrically conductive part of the inner pore surfaces may be 1 to 1000 nm. A thickness of 5 to 70 nm, of 10 to 70 nm, of 30 to 50 nm, of 50 to 100 nm, of 100 to 500 nm, of 100 to 1000 nm, of 200 to 800 nm or of 250 to 800 nm is also possible. Advantageously, the thickness of the electrically conductive electrode layer is 10 to 50 nm, 20 to 40 nm or 25 to 35 nm or 300 to 500 nm, 350 to 450 nm or 375 to 425 nm. Especially thin layers with the mentioned layer thicknesses in the nanometer range are advantageous because they add a minimum of mass to the overall mass of the capacitor and therefore allow for a lightweight construction, and because they, especially with precious-metal electrodes, enable producing the electrodes in a cost-effective way. Such low thicknesses are advantageous also because the thinner their layers are, the less are the pores of the base element filled with the electrode, the solid body electrolyte and the counter electrode. If, especially, the mentioned layers are so thin that they do not fill the pores, characteristics of the foam structure such as for example a thermal insulation effect are preserved for the capacitor according to the invention. A low overall thickness of all three mentioned layers is most easily achieved if the electrically conductive electrode layer as the layer that is closest to the base element and therefore the basic one of the mentioned three layers already has a very low thickness.

Secondly, the base element itself may comprise an electrically conductive foam structure. Suitable materials for such an electrically conductive foam structure are for example open-pored metal foams (e.g. aluminum, copper, magnesium, nickel), carbon-based foams (e.g. carbon foams, activated charcoal, graphite, glass carbon) and polymer foams based on thermoset materials and thermoplastics enriched with electrically conductive additives (e.g. microscaled or nano-scaled soot, carbon tubes, aerographites, fullerenes, pitch fibers, graphenes, metallic particles) or ceramic base materials, as far as those comprise sufficient electric conductivity. Such an electrically conductive foam structure comprises directly conductive inner pore surfaces and therefore does not have to be additionally coated in order to form the electrode. This is especially advantageous because it plays a part in achieving a smaller overall thickness of the mentioned layers in the inner pore surfaces because one of the three mentioned layers can be omitted, but also because the suitability of the capacitor for lightweight construction is yet increased.

The conductive or non-conductive foam structure may have been formed by foaming, for example a foaming of a polymer introduced by a foaming agent. The conductive or non-conductive foam structure may, however, also have been printed using the rapid prototype method. A metallic foam structure may also have been obtained by electrochemical etching. A molding process is also possible in which spheres or hollow spheres of a suitable polymer are sintered. The spheres may possibly have been metallized before sintering. During the sintering free spaces (interstices) between the spheres appear, causing porosity. In this way, a structure is produced which due to its porosity has the effects of a foam structure and therefore will be referred to as a foam structure here.

A thickness of the solid body electrolyte as well as a thickness of the counter electrode, may be 1 to 1000 nm, 5 to 70 nm, 10 to 70 nm, 30 to 50 nm, 50 to 100 nm, 100 to 500 nm, 100 to 1000 nm, 200 to 800 nm or 250 to 800 nm. Preferably, the thickness is 10 to 50 nm, 20 to 40 nm or 25 to 35 nm or 300 to 500 nm, 350 to 450 nm or 375 to 425 nm. The mentioned layer thicknesses for the solid body electrolyte and the counter electrode are advantageous for the same reasons as the small thicknesses of the electrically conductive electrode layer are. Additionally, a small layer thickness of the solid body electrolyte decreases the distance of the electrodes and necessary diffusion paths for the ions and therefore plays a part in providing a high capacity and short reaction times of the capacitor.

In a way analogous to the inner pore surface (and therefore the electrode surface), the counter electrode surface may also be nanostructured or microstructured in order to achieve the mentioned advantages. The inner pore surface as well as the counter electrode surface on the one hand or only the inner pore surface or only the counter electrode surface may be nanostructured or microstructured.

The object of the invention is also solved by a construction element comprising a foam structure. The construction element fulfils a holding, supporting, filling, insulating, sound-dampening, vibration-dampening or other constructive function. For example, the construction element may be formed with an insulating foam. It may, for example, insulate two parts of a vehicle against each other that are at differing temperatures. The construction element may, however, also be realized, for example, with a firm foam and, for example, support another construction element of an airplane. The construction element may also serve as a dampening element for sound and/or vibrations. The constructions and/or insulating element may also have as its only constructive function filling an empty space. According to the invention, the foam structure of the construction element at the same time is part of a capacitor according to the invention as described above.

In this way, advantageously, the construction element can have a double use. The construction element at the same time fulfils the function of a capacitor and another constructive function. In this way, on the one hand construction space can be saved in that capacitors do not take up their own construction space but use construction space that otherwise either would have remained completely empty or, for example, would have only been filled with an insulating material. On the other hand, in this way weight can be saved if for the capacitor according to the invention a foam structure is used that otherwise would have only had, for example, an insulating or space-filling effect. By this double use, an additional mass of the capacitor with respect to a "normal" construction element of the same type is only given by the layers of the electrolyte and the counter electrode and the contacting means of the capacitor. Saving construction space and/or weight is advantageous especially in vehicles, especially in aircraft and spacecraft, but also in earth-bound vehicles intended to reach high speeds and/or to be especially compact.

The construction element may comprise a hollow body which encloses the foam structure completely or partially. This may be advantageous especially if the construction element has a carrying or supporting function. In this case it is possible that a foam structure would yield too easily for the foam structure to be able to completely fulfil the carrying or supporting function on its own. In this case, the hollow body provides the necessary stability. The hollow body may, however, also enclose the foam structure for other reasons, for example in order to seal it against fluids, to provide a homogeneous surface or to make the foam structure easier to handle.

The hollow body may comprise a fiber composite material. Fiber composite materials while having a high stability are especially lightweight and therefore are preferred materials especially for building vehicles, especially aircraft and spacecraft. A construction element with a hollow body made of a fiber composite material therefore is especially lightweight while maintaining a desired stability.

The object of the invention is also solved by a method of manufacturing a construction element according to the invention. The layer of the solid body electrolyte is directly applied to the electrode provided by the base element and, subsequently, the electrically conductive counter-electrode layer for forming the counter electrode is directly applied to the solid body electrolyte. The construction element manufactured by the inventive method may in all details correspond to the construction element described above. Especially, the capacitor formed as part of the construction element may be as described above. A nanostructure on the electrically conductive part of the inner pore surfaces, however, is optional, contrary to what has been described above for the inventive capacitor.

The foam structure is directly produced in the hollow body in that an empty space in the hollow body is foam-filled with a foam material, i.e. the foam material is foamed inside the hollow body, e.g. by application of a foaming agent. While using an optimum amount of material, in this way the hollow body can be ideally filled with the foam structure. In this way, the foam structure may be produced outside a mounted state of the construction element. It is a special aspect of the invention, however, that an already mounted construction element can be remodelled into a construction element according to the invention by using the method according to the invention. For example, a foam structure as it is used in a usual way on aircraft to fill empty spaces can be remodelled into a construction element according to the invention—and therefore obtain another use—by using the method according to the invention. By means of the method according to the invention, empty spaces present in a vehicle or an aircraft or spacecraft, for example, can be remodelled into construction elements according to the invention and in this way be used as capacitors. In this way, spaces that had hitherto been unused can be used or constructive elements already used can obtain a new additional function. This does not only consider lightweight construction, but also minimizes the effective use of space by the capacitor according to the invention.

In manufacturing the construction element, it is to be ensured that the base element is electrically conductive at least in a part of the inner pore surfaces. This condition is immediately fulfilled if the foam structure is electrically conductive as described above. If the foam structure is electrically non-conductive, a conductive electrode layer may be applied to the foam structure to make it electrically conductive at least in a part of its inner pore surfaces as described above.

With the method according to the invention, the electrically conductive part of the inner pore surfaces and/or the counter electrode surface can be nanostructured or microstructured in order to achieve the above-mentioned advantages, that is, especially to enlarge a surface area. In order to achieve this, a microstructured or nanostructured electrically conductive layer may be applied, for example by CVD processes such as deposition from the gas phase by means of plasma (for example by plasma-enhanced chemical vapor deposition, PECVD, also referred to as plasma assisted chemical vapor deposition, PACVD), thermal CVD processes or other CVD processes.

The microstructured or nanostructured electrically conductive layer may be applied directly to the foam structure, where the foam structure itself may be electrically conductive or electrically non-conductive. The microstructured or nanostructured electrically conductive layer, however, may also be applied to a non-nanostructured electrically conductive electrode layer on the foam structure and in this way make sure of an enlarged electrically conductive surface. The microstructured or nanostructured electrically conductive layer then either forms the electrode itself or forms the electrode together with the foam structure and/or the non-microstructured or non-nanostructured electrically conductive electrode layer.

According to the method according to the invention, the electrically conductive electrode layer may be applied onto a part of the electrically non-conductive layer in order to produce the electrode. It may, however, be applied to the entire electrically non-conductive foam structure. For example, the electrically conductive electrode layer for forming the electrode may consist of a metal or an electrically conductive polymer. The electrically conductive electrode layer may for example be deposited from the gas phase by means of plasma (for example by PECVD/PACVD). A thermal CVD processes or another CVD or PVD process is also possible. Electrochemical deposition by means of galvanic processes is also possible.

With the mentioned method, an application of the electrically conductive counter-electrode layer in order to create the counter electrode is also possible. The counter electrode may be created in the same way as the electrode. It may, however, also be created with another method. It is especially possible for the electrode to be formed by the foam structure and for the counter electrode then to be applied with one of the mentioned methods.

Figure 2:
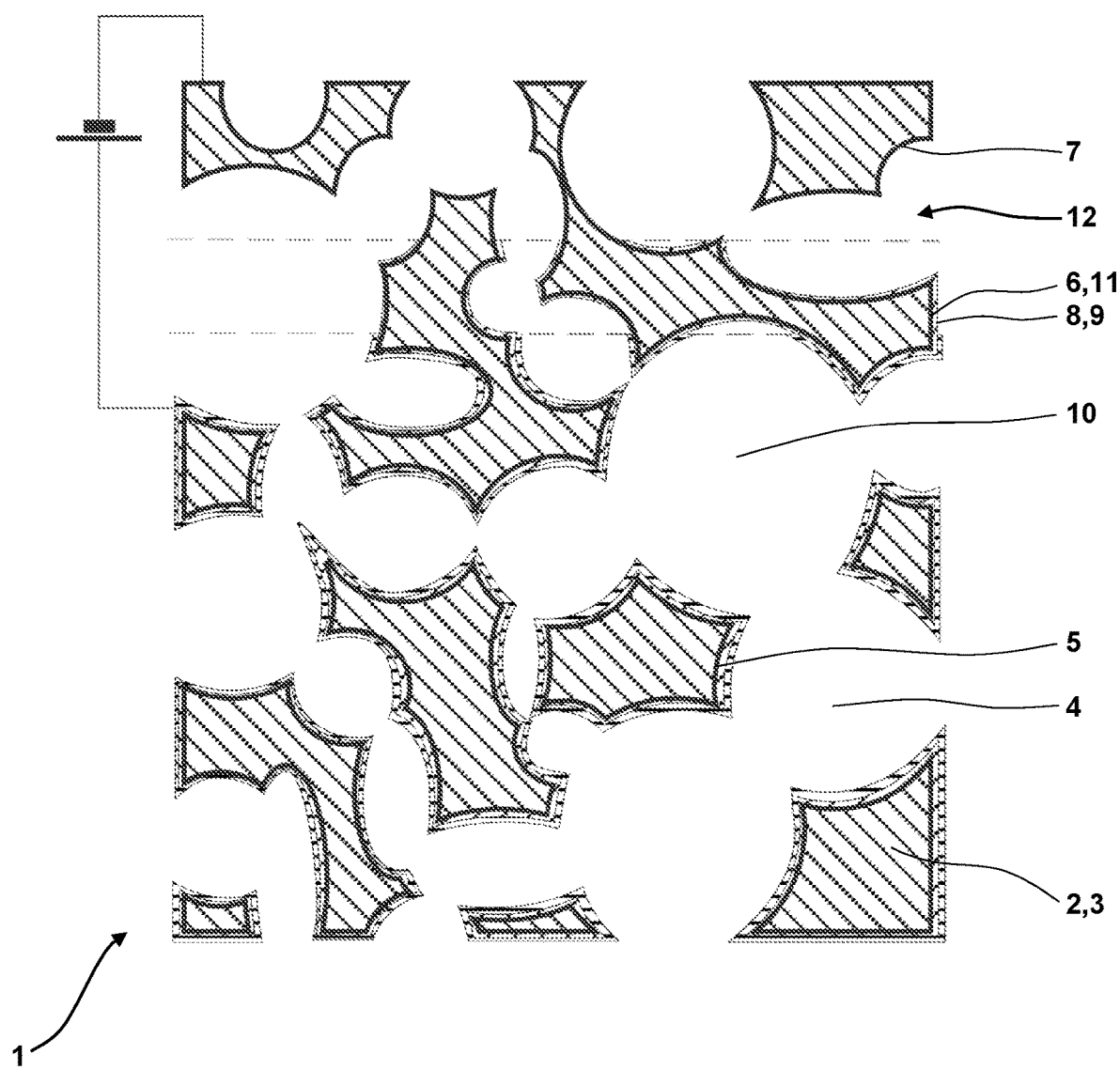
FIG. 2 is a schematic depiction of a capacitor according to the invention with an electrically non-conductive foam structure.

Referring now in greater detail to the drawings, FIGS. 1 and 2, each in a strongly schematized way, show a capacitor 1 according to the invention. However, only a detail of the capacitor 1 with dimensions of a few nanometers to a few hundred nanometers is shown. This detail has been enlarged strongly. Electric contacting of the capacitor 1 is indicated in the upper left.

A base element 2 of the capacitor 1 is formed by a foam structure 3. The foam structure 3 comprises a number of pores 4. In the example shown, the sizes of the pores 4 vary and the pores 4 are arranged in an irregular way. The pores 4 of a capacitor according to the invention, however, may have a uniform size and be arranged in a regular way. Within the pores 4, a free space 10 is formed. In the example shown, the free space 10 is not continuous between all pores 4, but some individual pores 4 are closed off with respect to the free space 10. The free space 10, however, may also be continuous between all or at least most pores 4 of the base element 2. The pores 4 have inner pore surfaces 5. A nanostructuring on the inner pore surfaces 5 may be present, though, for reasons of scale, not expressly shown.

In FIG. 1, a capacitor 1 is shown where the base element 2 is formed by a conductive foam structure 3. The foam structure 3 therefore forms an electrode 6 of the capacitor at the same time. On the inner pore surfaces 5 of the foam structure 3, and therefore directly on the electrode 6, a layer of a solid body electrolyte 7 is arranged. Directly on the solid body electrolyte 7, in turn, a conductive counter-electrode layer 9 is arranged. The conductive counter-electrode layer 9 therefore forms a counter electrode 8. The foam structure 3 as the electrode 6 and the conductive counter-electrode layer 9 as the counter electrode 8 are individually electrically contacted and electrically insulated with respect to one another. In order to enable electric contacting, a transition region 12 is formed, on one (the smaller) side of which the foam structure 3 as the electrode 6 is free for contacting and on the other (larger, possibly predominatingly larger) side of which the foam structure 3 is coated by the solid body electrolyte 7 and the electrically conductive counter-electrode layer 9 to form the counter electrode 8, so that the counter electrode 8 can be contacted on this side.

In FIG. 2, a capacitor 1 is shown where the base element 2 is formed by a non-conductive foam structure 3. On the inner pore surfaces 5 of the foam structure 3, a conductive electrode layer 11 is arranged forming the electrode 6. On the conductive electrode layer 11, and therefore directly on the electrode 6, a layer of the solid body electrolyte 7 is arranged. Directly on the solid body electrolyte 7, in turn, a conductive counter-electrode layer 9 is arranged. The conductive counter-electrode layer 9 therefore forms the counter electrode 8. The conductive electrode layer 11 as the electrode 6 and the conductive counter-electrode layer 9 as the counter electrode 8 are individually electrically contacted. In order to enable electric contacting, a transition region 12 is formed, on one (the smaller) side of which the foam structure 3 is only coated with the conductive electrode layer 11 as the electrode 6 and where therefore the conductive electrode layer 11 is free for contacting and on the other (larger, possibly predominatingly larger) side of which the foam structure 3 is coated by the conductive electrode layer 11, the solid body electrolyte 7 and the electrically conductive counter-electrode layer 9 to form the counter electrode 8, so that the counter electrode 8 can be contacted on this side.

Figure 3:
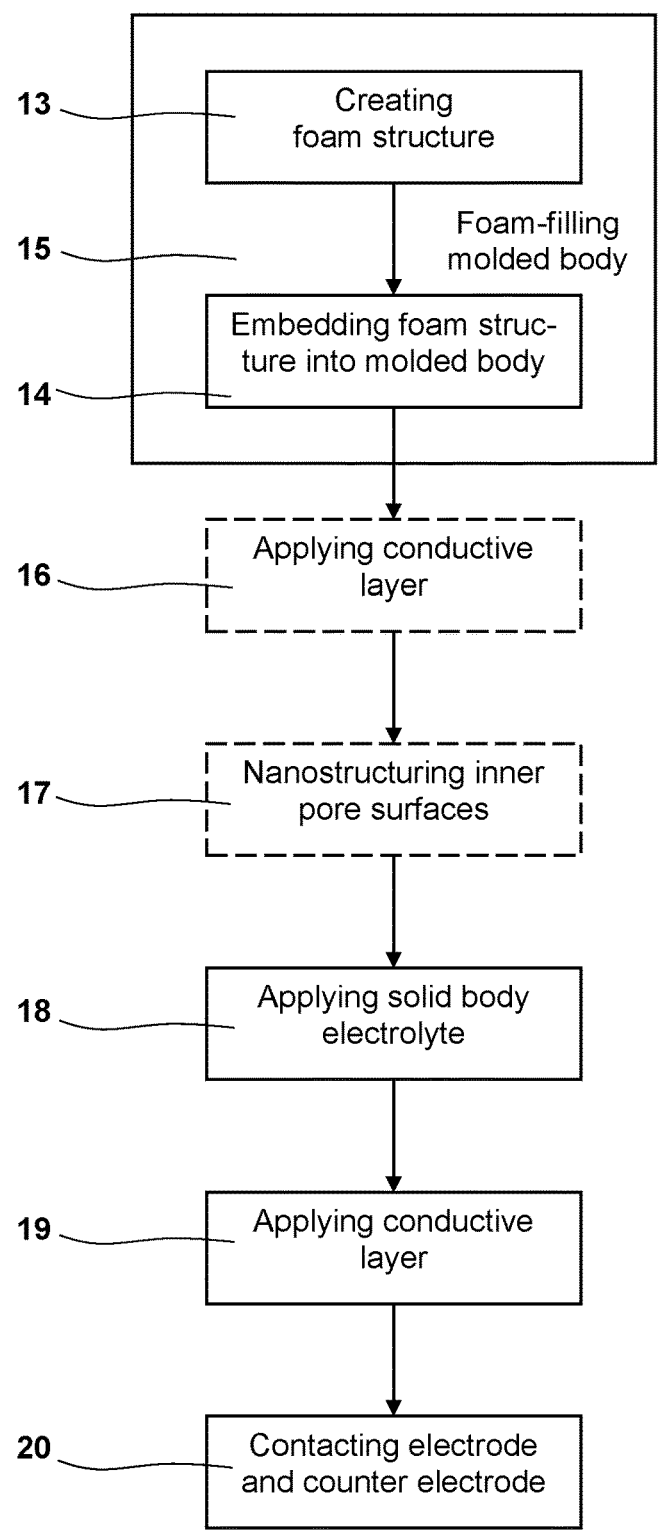
FIG. 3 is a flow chart illustrating a method according to the invention of manufacturing a construction element according to the invention comprising a capacitor according to the invention.

FIG. 3 illustrates a method according to the invention for manufacturing a construction element according to the invention, which encloses a capacitor 1 according to the invention.

In a first step 13, the foam structure 3 is created by foaming a suitable material, e.g. a polymer. In a second step 14, the foam structure is embedded into a hollow body. The first and second steps 13, 14 are executed at the same time in another step 15. Therefore, the foam structure 3 is created by foam-filling the hollow body or an empty space in the hollow body.

In another step 16, the conductive electrode layer 11 is applied to the foam structure 3 and in this way the electrode 6 constructed. The base element 2 is then formed with the foam structure 3 and the conductive electrode layer 11. It can be seen from FIG. 3 that the step 16 of applying the conductive electrode layer 11 for the electrode 6 may be executed optionally. This step 16 may be omitted if the foam structure 3 itself is conductive and therefore can form the electrode 6. In this case, the base element 2 usually does not contain an additional conductive electrode layer 11.

In another step 17, also optionally, the surface of an electrically conductive part of the inner pore surfaces 5 (formed by the foam structure 3 or the conductive electrode layer 11) may be nanostructured, for example by CVD. The step 17 of nanostructuring the inner pore surfaces may be omitted if no nanostructuring is desired or if the electrically conductive part of the inner pore surfaces 5 already comprises nanostructuring.

In another step 18, the layer of the solid body electrolyte is applied to the electrode 6. Suitable methods result from the kind of the solid body electrolyte: For organic solid body electrolytes such as Nafion, for example PECVD/PACVD or thermic CVD are suitable. For inorganic, crystalline or amorphous solid body electrolytes such as lithium phosphorus oxynitride (LiPON) or other lithium compounds such as $Li_2S$—$P_2S_5$, $Li_{14}Zn(GeO_4)_4$ or $Li_{1.3}Al_{0.3}Ti_{1.7}(PO_4)_3$ (NASICON) radiofrequency magnetron sputtering or reactive PVD are suitable, for example. In another step 19, an electrically conductive counter-electrode layer 11 forming the counter electrode 8 is applied to the solid body electrolyte 7.

The electrically conductive layers 9, 11 for the electrode and the counter electrode can be applied (steps 16, 19) in the same way or in a different way. For example, each electrically conductive layer 9, 11 may be deposited from the gas phase by means of plasma, e.g. by PECVD/PACVD, or via a thermic or other CVD process, PVD or an electrochemical deposition by galvanic processes.

In another step 20, the electrode 6 and the counter electrode 11 are electrically contacted in order to be able to form a capacitor 1. The electrode 6 and the counter electrode 11, however, may be contacted in an earlier step already, if this integrates into the step to be executed in a suitable way.

Many variations and modifications may be made to the preferred embodiments of the invention without departing substantially from the spirit and principles of the invention. All such modifications and variations are intended to be included herein within the scope of the present invention, as defined by the following claims.

We claim:

1. A construction element comprising a foam structure, wherein the foam structure is part of a capacitor with a layered construction on a base element, the base element comprising the foam structure and having open pores comprising inner pore surfaces, where the base element is electrically conductive at least in a part of the inner pore surfaces and thus forms a continuous electrode, wherein
   a) the electrically conductive part of the inner pore surfaces is nanostructured,
   b) a layer of a solid body electrolyte is arranged directly on the electrode,
   c) an electrically conductive counter-electrode layer forming a counter electrode is arranged directly on the solid body electrolyte,
   d) the counter electrode forms a thin layer, so that within the open pores a continuous free space remains,
   e) the construction element comprises a hollow body which encloses the foam structure,
   f) the foam structure fills an empty space of the hollow body, and
   g) the hollow body comprises a fiber composite material.

2. The construction element of claim 1, wherein the foam structure is electrically non-conductive and the base element comprises an electrically conductive electrode layer in the region of the electrically conductive part of the inner pore surfaces.

3. The construction element of claim 2, wherein a thickness of the electrically conductive electrode layer in the region of the electrically conductive part of the inner pore surfaces is 10 to 50 nm or 300 to 500 nm.

4. The construction element of claim 1, wherein a thickness of the solid body electrolyte is 10 to 50 nm or 300 to 500 nm.

5. The construction element of claim 1, wherein a thickness of the counter electrode is 10 to 50 nm or 300 to 500 nm.

6. The construction element of claim 1, wherein the foam structure is electrically conductive.

7. The construction element of claim 1, wherein the base element comprises an electrically non-conductive foam structure, a non-nanostructured electrically conductive layer arranged on the foam structure, and a nanostructured electrically conductive layer arranged on the non-nanostructured electrically conductive layer in the region of the electrically conductive part of the inner pore surfaces.

* * * * *